(12) United States Patent
Fan et al.

(10) Patent No.: US 11,049,232 B2
(45) Date of Patent: Jun. 29, 2021

(54) IMAGE FUSION APPARATUS AND IMAGE FUSION METHOD

(71) Applicant: Hangzhou Hikvision Digital Technology Co., Ltd., Zhejiang (CN)

(72) Inventors: Meng Fan, Zhejiang (CN); Hai Yu, Zhejiang (CN); Shiliang Pu, Zhejiang (CN)

(73) Assignee: Hangzhou Hikvision Digital Technology Co., Ltd., Zhejiang (CN)

(*) Notice: Subject to any disclaimer, the term of this patent is extended or adjusted under 35 U.S.C. 154(b) by 228 days.

(21) Appl. No.: 16/481,397

(22) PCT Filed: Jan. 25, 2018

(86) PCT No.: PCT/CN2018/074093
§ 371 (c)(1),
(2) Date: Jul. 26, 2019

(87) PCT Pub. No.: WO2018/145575
PCT Pub. Date: Aug. 16, 2018

(65) Prior Publication Data
US 2019/0378258 A1 Dec. 12, 2019

(30) Foreign Application Priority Data
Feb. 10, 2017 (CN) .......................... 201710074203.9

(51) Int. Cl.
*G06T 5/50* (2006.01)
*H04N 9/04* (2006.01)
(Continued)

(52) U.S. Cl.
CPC ............. *G06T 5/50* (2013.01); *H04N 5/2258* (2013.01); *H04N 5/33* (2013.01); *H04N 9/04553* (2018.08); *G06T 2207/20221* (2013.01)

(58) Field of Classification Search
CPC ............ G06T 5/50; G06T 2207/20221; H04N 9/04553; H04N 5/2258; H04N 5/33
See application file for complete search history.

(56) References Cited

U.S. PATENT DOCUMENTS 8,619,143 B2   12/2013  Motta
8,675,105 B2 *  3/2014  Lansel ............... H04N 9/04515
                                                              348/273
(Continued)

FOREIGN PATENT DOCUMENTS

CN          102447826 A      5/2012
CN          102687502 A      9/2012
(Continued)

*Primary Examiner* — Gregory M Desire
(74) *Attorney, Agent, or Firm* — Bret E. Field; Bozicevic, Field & Francis LLP

(57) ABSTRACT

Embodiments of the present application provide an image fusion apparatus and an image fusion method. The image fusion apparatus includes: a light acquisition device, an image processor, and an image sensor having four types of photosensitive channels. The four types of photosensitive channels include red, green and blue RGB channels and an infrared IR channel. The light acquisition device is configured to filter a spectrum component of a first predetermined wavelength range from incident light to obtain target light. The first predetermined wavelength range is a spectrum wavelength range in which a difference between the responsivities of the RGB channels and the responsivity of the IR channel in the image sensor in the infrared band is higher than a first predetermined threshold. The image sensor is configured to convert the target light into an image signal through the RGB channels and the IR channel. The image processor is configured to analyze the image signal into color signals and a brightness signal that is photosensitive to an infrared band, and perform fusion process on the color signals and the brightness signal to obtain a fused image.

(Continued)

Filtering a spectrum component of a first predetermined wavelength range from incident light to obtain target light; wherein the first predetermined wavelength range is a spectrum wavelength range in which a difference between responsivities of the RGB channels and a responsivity of the IR channel in an image sensor of the image fusion apparatus at an infrared band is greater than a first predetermined threshold — S1401

Converting the target light into an image signal through the RGB channels and the IR channel — S1402

Analyzing the image signal into color signals and a brightness signal that is photosensitive to the infrared band, and fusing the color signals and the brightness signal to obtain a fused image. A color signal is a signal obtained based on the R channel, the G channel, or the B channel — S1403

With the present solution, the calculation for removing the infrared component from the color signals can be simplified, which improves the efficiency of image fusion.

20 Claims, 7 Drawing Sheets

(51) Int. Cl.
*H04N 5/225* (2006.01)
*H04N 5/33* (2006.01)

(56) References Cited

U.S. PATENT DOCUMENTS

| | | | | |
|---|---|---|---|---|
| 8,913,118 | B2* | 12/2014 | Millikan | G01J 3/2823 |
| | | | | 348/77 |
| 9,177,988 | B2* | 11/2015 | Jones | H01L 27/14645 |
| 10,027,933 | B2* | 7/2018 | Won | H04N 9/67 |
| 10,182,216 | B2* | 1/2019 | Mullis | H04N 9/093 |
| 10,839,573 | B2* | 11/2020 | Marino | G06T 7/44 |
| 2014/0218598 | A1* | 8/2014 | Yeh | G02B 9/10 |
| | | | | 348/360 |
| 2016/0065926 | A1 | 3/2016 | Nonaka et al. | |
| 2017/0134704 | A1 | 5/2017 | Otsubo et al. | |
| 2017/0163914 | A1 | 6/2017 | Hara | |
| 2019/0355122 | A1* | 11/2019 | Zhang | G06T 7/90 |
| 2019/0378257 | A1* | 12/2019 | Fan | H04N 9/045 |
| 2019/0378258 | A1* | 12/2019 | Fan | G06T 5/50 |

FOREIGN PATENT DOCUMENTS

| | | |
|---|---|---|
| CN | 104280803 A | 1/2015 |
| CN | 104683767 A | 6/2015 |
| CN | 104867123 A | 8/2015 |
| CN | 105323567 A | 2/2016 |
| CN | 105514132 A | 4/2016 |
| CN | 105704463 A | 6/2016 |
| CN | 106249332 A | 12/2016 |
| JP | 4695550 B2 | 6/2011 |
| WO | WO2015198127 A1 | 12/2015 |
| WO | WO2016027397 A1 | 2/2016 |

* cited by examiner

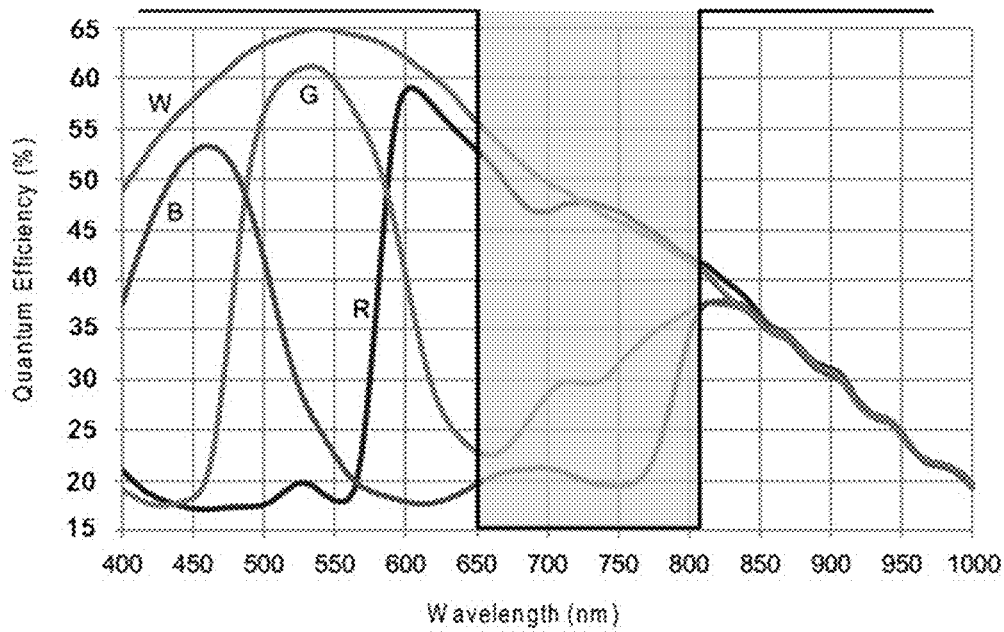

Figure 13

| Filtering a spectrum component of a first predetermined wavelength range from incident light to obtain target light; wherein the first predetermined wavelength range is a spectrum wavelength range in which a difference between responsivities of the RGB channels and a responsivity of the IR channel in an image sensor of the image fusion apparatus at an infrared band is greater than a first predetermined threshold | ~S1401 |

↓

| Converting the target light into an image signal through the RGB channels and the IR channel | ~S1402 |

↓

| Analyzing the image signal into color signals and a brightness signal that is photosensitive to the infrared band, and fusing the color signals and the brightness signal to obtain a fused image . A color signal is a signal obtained based on the R channel, the G channel, or the B channel | ~S1403 |

Figure 14

IMAGE FUSION APPARATUS AND IMAGE FUSION METHOD

The present application claims the priority to a Chinese patent application No. 201710074203.9 filed with the China National Intellectual Property Administration on Feb. 10, 2017 and entitled "Image Fusion Apparatus and Image Fusion Method," which is incorporated herein by reference in its entirety.

TECHNICAL FIELD

The present application relates to the technical field of image processing, and in particular, to an image fusion apparatus and image fusion method.

BACKGROUND

In low illumination conditions, an image acquisition device with a beam splitting and fusion function is usually required to acquire an image, in order to ensure that the acquired image contains more image information. Specifically, the basic principle for acquisition an image through the image acquisition device with the beam splitting and fusion function is as follows: acquiring a visible light image corresponding to visible light signals and acquisition an infrared image corresponding to infrared light signals, and fusing the visible light image and the infrared image to obtain a fused image. The fused image is a dual-band image, which contains more image information than a single-band image, either the visible light image or the infrared light image.

The image acquisition device with the beam splitting and fusion function specifically includes a transflective mirror, a visible light sensor, an infrared light sensor, a registration unit, and a fusion unit. Specifically, the transflective mirror is used to separate incident light into visible light and infrared light. The visible light sensor is used to acquire visible light to produce a visible light image, and the infrared light sensor is used to acquire infrared light to produce an infrared image. The registration unit is used to eliminate a position deviation between the infrared image and the visible light image. The fusion unit is used to perform weighted fusion on the infrared image and the visible light image the positions of which have been corrected by the registration unit. The resulting fused image obtained by the fusion is an output image of the image acquisition device.

The image acquisition device with the beam splitting and fusion function can obtain a fused image. However, there may be an infrared component in a visible light image. When receiving the visible light image, an image processor will remove the infrared component from the visible light image (i.e., the color signal). This requires a large amount of calculation and thus results in a low efficiency of image fusion.

SUMMARY

The objective of embodiments of the present application is to provide image fusion apparatuses and image fusion methods, to reduce the amount of calculation for removing an infrared component from a color signal by a processor and to improve the efficiency of image fusion. The specific technical solutions are as follows.

In a first aspect, an embodiment of the present application provides an image fusion apparatus, including:

a light acquisition device, an image processor, and an image sensor having four types of photosensitive channels, the four types of photosensitive channels including red, green and blue RGB channels and an infrared IR channel; wherein the light acquisition device is configured to filter a spectrum component of a first predetermined wavelength range from incident light to obtain target light; wherein the first predetermined wavelength range is a spectrum wavelength range in which a difference between responsivities of the RGB channels and a responsivity of the IR channel in the image sensor at an infrared band is greater than a first predetermined threshold;

the image sensor is configured to convert the target light into an image signal through the RGB channels and the IR channel; and the image processor is configured to analyze the image signal into color signals and a brightness signal that is photosensitive to the infrared band, and fuse the color signals and the brightness signal to obtain a fused image, wherein the color signal is a signal obtained based on the R channel, the G channel, or the B channel.

In a second aspect, an embodiment of the present application provides an image fusion apparatus, including:

a light acquisition device, an image processor, and an image sensor having four types of photosensitive channels, the four types of photosensitive channels including red, green and blue RGB channels and a full-band W channel; wherein the light acquisition device is configured to filter a spectrum component of a first predetermined wavelength range from incident light to obtain target light; wherein the first predetermined wavelength range is a spectrum wavelength range in which a difference between responsivities of the RGB channels and a responsivity of the W channel in the image sensor at an infrared band is greater than a first predetermined threshold;

the image sensor is configured to convert the target light into an image signal through the RGB channels and the W channel; and the image processor is configured to analyze the image signal into color signals and a brightness signal, and fuse the color signals and the brightness signal to obtain a fused image, wherein the color signal is a signal obtained based on the R channel, the G channel, or the B channel.

In a third aspect, an embodiment of the present application further provides an image fusion method, which is applicable to an image fusion apparatus. The image fusion apparatus has four types of photosensitive channels, which include red, green and blue RGB channels and an infrared IR channel. The method includes:

filtering a spectrum component of a first predetermined wavelength range from incident light to obtain target light; wherein the first predetermined wavelength range is a spectrum wavelength range in which a difference between responsivities of the RGB channels and a responsivity of the IR channel in an image sensor of the image fusion apparatus at an infrared band is greater than a first predetermined threshold;

converting the target light into an image signal through the RGB channels and the IR channel; and analyzing the image signal into color signals and a brightness signal that is photosensitive to the infrared band, and fusing the color signals and the brightness signal to obtain a fused image, wherein the color signal is a signal obtained based on the R channel, the G channel, or the B channel.

In a fourth aspect, an embodiment of the present application provides an image fusion method, which is applicable to an image fusion apparatus. The image fusion apparatus has four types of photosensitive channels, which include red, green and blue RGB channels and a full band W channel. The method includes:

filtering a spectrum component of a first predetermined wavelength range from incident light to obtain target light; wherein the first predetermined wavelength range is a spectrum wavelength range in which a difference between responsivities of the RGB channels and a responsivity of the W channel in an image sensor of the image fusion apparatus at an infrared band is greater than a first predetermined threshold;

converting the target light into an image signal through the RGB channels and the W channel; and analyzing the image signal into color signals and a brightness signal, and fusing the color signals and the brightness signal to obtain a fused image, wherein the color signal is a signal obtained based on the R channel, the G channel, or the B channel.

In a fifth aspect, an embodiment of the present application provides a storage medium for storing executable codes. The executable codes are executed to perform steps of the image fusion method provided by the embodiment of the present application in the third aspect.

In a sixth aspect, an embodiment of the present application provides a storage medium for storing executable codes. The executable codes are executed to perform steps of the image fusion method provided by the embodiment of the present application in the fourth aspect.

In a seventh aspect, an embodiment of the present application provides an application program that, when executed, carries out steps of the image fusion method provided by the embodiment of the present application in the third aspect.

In an eighth aspect, an embodiment of the present application provides an application program that, when executed, carries out steps of the image fusion method provided by the embodiment of the present application in the fourth aspect.

It can be seen, in the embodiments of the present application, the light acquisition device filters the spectrum component of the first predetermined wavelength range from the incident light, so that the portion in which there is a large difference between the quantum efficiencies of the channels at the near-infrared band is filtered out. This can simplify the calculations performed by the image processor to remove the infrared component from the color signals, and thus improve the efficiency of the image fusion. Moreover, the image fusion apparatus provided by the embodiment of the present application uses the image sensor having the four types of photosensitive channels to acquire images. Compared to means that requires special design on its optical system to simultaneously acquire infrared light and visible light, the complexity of the structure of the image fusion apparatus is greatly reduced, allowing the image fusion apparatus to be widely used.

In addition, the image fusion methods provided by the embodiments of the present application can reduce the amount of calculation for removing the infrared component from color signals. This improves the efficiency of image fusion and achieves the objective of capturing a dual-band image through an image fusion apparatus having a simple structure.

BRIEF DESCRIPTION OF THE DRAWINGS

In order to illustrate the technical solutions of the embodiments of the present application and the related art more clearly, the drawings used in the embodiments and the related art will be briefly described below. It is obvious that the drawings described below are only for some embodiments of the present application. Those of ordinary skills in the art may obtain other drawings without any creative effort based on the drawings herein.

FIG. 9 is a diagram schematically showing an array corresponding to an RGBW image sensor;

FIG. 10 is a diagram schematically showing an interpolation result for the W channel interpolation;

FIG. 13 is a diagram schematically showing another principle of spectrum filtering;

FIG. 14 is a flowchart of an image fusion method applicable to an image fusion apparatus provided by the first aspect, which is provided by an embodiment of the present application;

DETAILED DESCRIPTION

In order to make the objective, technical solutions, and advantages of the present application more clear, the present application will be further described in details below with reference to the accompanying drawings. Obviously, the described embodiments are only some of the embodiments of the present application, instead of all of them. Any other embodiments obtained by a person of ordinary skills in the art based on the embodiments herein without any creative efforts fall within the protection scope of the present application.

In the first aspect, an embodiment of the present application provides an image fusion apparatus, to solve the problem of a low efficiency of image fusion due to a large amount of calculation performed by an image processor for removing an infrared component from color signals.

Figure 1:
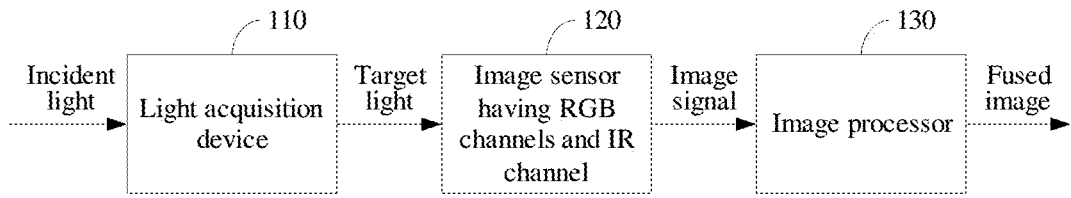
FIG. 1 is a diagram schematically showing the structure of an image fusion apparatus provided by the first aspect of the present application.

As shown in FIG. 1, the image fusion apparatus provided by the embodiment of the present application may include:

a light acquisition device 110, an image processor 130, and an image sensor 120 having four types of photosensitive channels. The four types of photosensitive channels include red, green and blue RGB channels and an infrared IR channel.

The light acquisition device 110 is configured to filter a spectrum component of a first predetermined wavelength range from incident light to obtain target light. The first predetermined wavelength range is a spectrum wavelength range in which a difference between the responsivities of the RGB channels and the responsivity of the IR channel in the image sensor 120 at an infrared band is greater than a first predetermined threshold.

The image sensor 120 is configured to convert target light into an image signal through the RGB channels and the IR channel.

The image processor 130 is configured to analyze the image signal into color signals and a brightness signal that is photosensitive to an infrared band, and fuse the color signals and the brightness signal to obtain a fused image. Such a color signal is a signal obtained based on the R channel, the G channel, or the B channel.

It should be emphasized that the spectrum component of the first predetermined wavelength range is filtered out from the incident light, such that the portion in which there is a large difference between the quantum efficiencies of the channels at the near-infrared band is filtered out. This can simplify the operations performed by the image processor to remove the infrared component from the color signals, and thus improve the efficiency of the image fusion. The value of the first predetermined threshold may be set depending on actual conditions, and is not limited herein. It should be emphasized that, as long as any of three differences, i.e., the difference between the value of the R channel and the value of the IR channel, the difference between the value of the G channel and the value of the IR channel, and the difference between the value of the B channel and the value of the IR channel, is greater than the first predetermined threshold, the light acquisition device 110 will filter out the spectrum component of a corresponding wavelength range.

Figure 2:
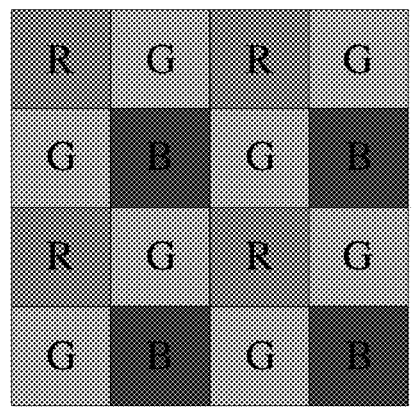
FIG. 2 is a diagram schematically showing a Bayer pattern.
Figure 5:
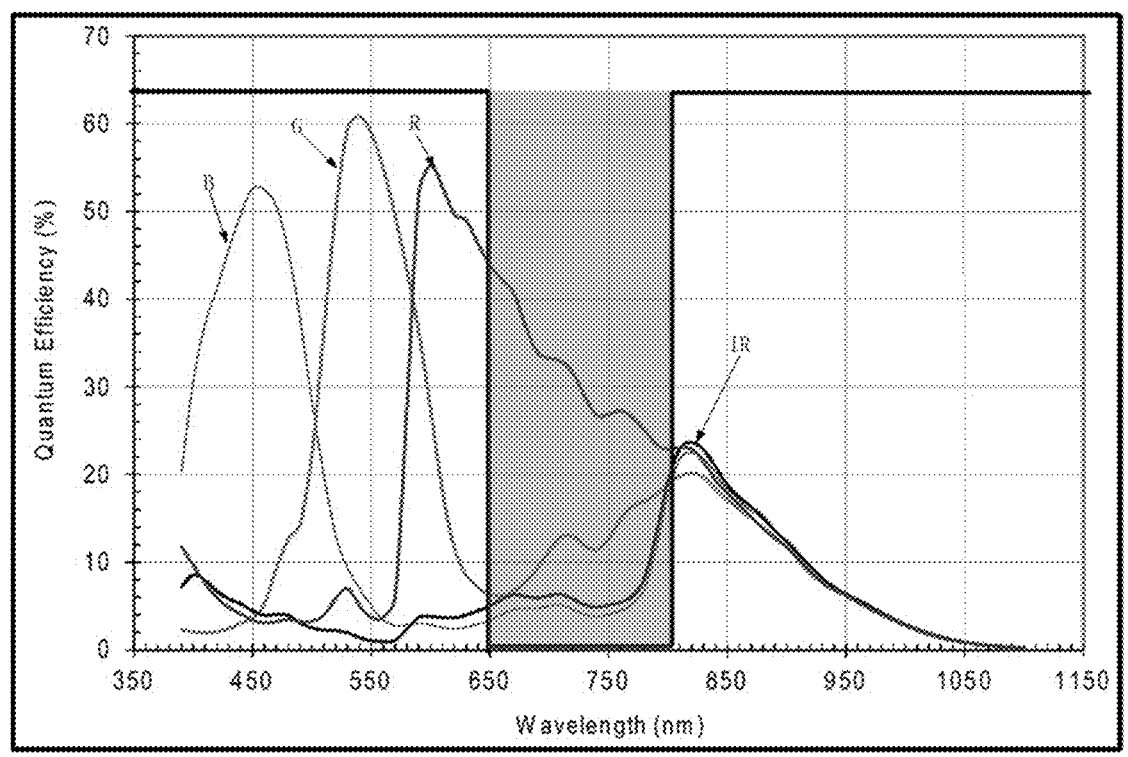
FIG. 5 is a diagram schematically showing the principle of spectrum filtering.

Optionally, in order to allow the infrared band and the visible band to pass, the first predetermined wavelength range may be [T1, T2]. The value of T1 is in the range of [600 nm, 800 nm], and the value of T2 is in the range of [750 nm, 1100 nm]. It can be appreciated that, with the additional function of filtering the spectrum component of the predetermined wavelength range from the incident light, the spectrum component in which there is a large difference between the responsivities of the RGB channels and the responsivity of the IR channel in the image sensor 120, at the infrared band (650-1100 nm), is filtered out. Thereby, the color signals and the brightness signal that is photosensitive to the infrared band (650-1100 nm) can be precisely restored with simplified calculations from the image signal generated by the image sensor 120. As shown in FIG. 5, the gray portion is the spectrum portion that needs to be filtered out. In FIG. 5, IR represents the infrared signal, R represents the red light signal, G represents the green light signal, and B represents the blue light signal. It should be emphasized that FIG. 5 merely shows an example, which will not limit the embodiments of the present application. Due to manufacturing processes or the like, the actual filtered curves usually have slopes not as steep as those shown in FIG. 5. Those skilled in the art can appreciate that the Bayer pattern is a data format for image sensors. FIG. 2 shows a schematic diagram of the Bayer pattern, which outputs the red, green, and blue dot matrix information in a mosaic manner. An image sensor based on Bayer pattern has only three channels, i.e., RGB channels, and cannot obtain the infrared spectrum component. Therefore, in order to obtain a fused image from a visible light image and an infrared image, a prism beam splitter, different optical sensors, and the like are required to simultaneously acquire infrared light and visible light, which results in a complex structure. In order to decrease the complexity of the structure, an image sensor having four types of photosensitive channels is employed in the embodiments of the present application, such that color signals and a brightness signal that is photosensitive to an infrared band can be obtained from an image signal acquired by one single image sensor. For ease of explanation, the image sensor having the red, green and blue RGB channels and the infrared IR channel provided by the embodiments of the present application is referred to as an RGBIR image sensor.

Figure 3:
FIG. 3 is a diagram schematically showing an array corresponding to an RGBIR image sensor.

Specifically, FIG. 3 shows a diagram of an array corresponding to the RGBIR image sensor. As shown in FIG. 3, the RGBIR image sensor includes four types of photosensitive channels, namely, RGB channels and an IR channel. Specifically, the IR channel is photosensitive to the infrared band; the RGB channels are photosensitive to both visible light band and infrared band, and the RGB channels are primarily used to obtain visible light. It should be emphasized that the array shown in FIG. 3 is merely for the purpose of illustration and should not be construed as limiting the embodiments of the present application. In addition, those skilled in the art can appreciate that, in practical applications, there are various arrays for the RGBIR image sensor, all of which can be applied to the embodiments of the present application.

It should be noted that the color signals can be generated by subtracting the value of an IR parameter for a pixel position from the value of the R channel, the G channel, or the B channel. The value of the IR parameter is the product of the value of the IR channel at the pixel position and a preset correction value. It can be appreciated that subtracting the value of the IR parameter for the pixel position respectively from the values of the R channel, G channel or B channel, namely removing the infrared component from the color signals, can avoid the crosstalk between the infrared component and the RGB signal components of the color signals, thereby improving the quality of the image obtained under low illumination. It should be emphasized that the preset correction value can be set depending on actual conditions. For example, the preset correction value can be generally set to 1. Of course, the preset correction value can also be set to any integer or fraction ranging from 0 to 1024 depending on actual conditions. Those skilled in the art can appreciate that the value of the preset correction value is not limited thereto. Optionally, in a specific implementation, the process that the image processor 130 analyzes the image signal into the color signals and the brightness signal that is photosensitive to the infrared band includes:

step a1, performing an interpolation operation on the IR channel of the image signal to generate a brightness signal that has a resolution same as an input resolution and is photosensitive to the infrared band, wherein the input resolution is the resolution of the image signal;

step a2, traversing the image signal and subtracting the value of an IR parameter for a pixel position from the value of the traversed R channel, G channel, or B channel, wherein the value of the IR parameter is the product of the value of the IR channel at the pixel position and the preset correction value; and step a3, performing interpolation operations on the R channel, the G channel and the B channel of the image signal respectively, to generate the color signals having a resolution same as the input resolution.

Figure 4:
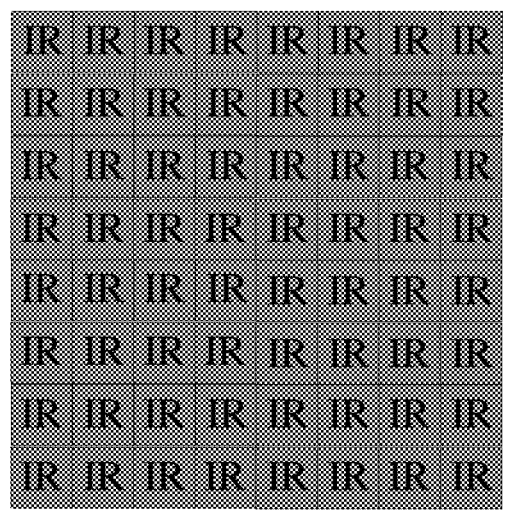
FIG. 4 is a diagram schematically showing an interpolation result for the IR channel interpolation.

Taking the array shown in FIG. 3 as an example again, each small square corresponds to one pixel, and the resolution of the image signal generated by the RGBIR image sensor is 8*8, as shown in FIG. 3. Since the interpolation of the IR channel of the image signal generates the brightness signal having the resolution same as the input resolution and being photosensitive to the infrared band, the brightness signal generated by the interpolation of the IR channel of the image signal as shown in FIG. 3 also has a resolution of 8*8. The result of the interpolation of the IR channel may be as shown in FIG. 4. Moreover, the interpolation of the IR channel of the image signal may be performed by an interpolation algorithm such as bilinear interpolation or bicubic interpolation, which is not limited herein. It should be emphasized that the resolution of the image signal generated by the RGBIR image sensor is related to the structure of the array. The resolution of 8*8 is only the resolution corresponding to the RGBIR image sensor having an array structure as shown in FIG. 3, which should not limit the embodiments of the present application.

In addition, as shown in FIG. 3, each small square may correspond to the R channel, the B channel, or the G channel. Therefore, when traversing the image signal, the R channel, the G channel or the B channel may be traversed and then the value of the IR parameter for the pixel position is subtracted from the value of the traversed R channel, the G channel, or the B channel to remove the infrared component. Moreover, the respective interpolation algorithms used for the interpolations of the R channel, the G channel, and the B channel of the image signal may be such as bilinear interpolation or bicubic interpolation. The interpolation algorithm used for interpolation of the IR channel may or may not be the same as that used for the interpolations of the RGB channels, which will not be limited herein. Similarly, the color signal generated by the interpolation of each of the R channel, the G channel and the B channel of the image signal has a resolution same as the input resolution. Taking FIG. 3 as an example again, the resolution of the color signals generated by the interpolations of the RGB channels of the image signal is also 8*8.

It should be emphasized that the above implementation that the image processor 130 analyzes the image signal into the color signals and the brightness signal that is photosensitive to the infrared band is merely an example and should not be construed as limitation of the embodiments of the present application.

It can be appreciated that after the color signals and the brightness signal are obtained, there are many specific implementations for the image processor 130 to fuse the color signals and the brightness signal to obtain the fused image. Two of the implementations will be described in details below.

In a specific implementation, the process that the image processor 130 fuses the color signals and the brightness signal to obtain the fused image may include:

step b1, calculating an auxiliary value Y for each pixel according to the color signals as Y=(R*w1+G*w2+B*w3)/(w1+w2+w3), where R is the value of the R channel of the pixel, G is the value of the G channel of the pixel, B is the value of the B channel of the pixel, and w1, w2 and w3 are weights;

step b2, calculating a ratio of the value of each channel of the color signals to the auxiliary value Y to obtain reference channel values K1, K2, and K3 for the pixel, which are K1=R/Y, K2=G/Y, K3=B/Y;

step b3, performing chroma noise reduction on the reference channel values K1, K2, and K3; and step b4, fusing a brightness value Y' of the pixel and the reference channel values K1-K3 subjected to the chroma noise reduction, to generate fused values of the three channels (RGB channels) R', G' and B' and to obtain the fused image, which are calculated as R'=K1*Y'; G'=K2*Y'; B'=K3*Y'.

The embodiments of the present application do not limit the values of the weights w1, w2, and w3. The method for the chroma noise reduction may include, but is not limited to, Gaussian filtering. For example, assuming w1=1, w2=1 and w3=1, then Y=(R+G+B)/3.

In another specific implementation, the process that the image processor 130 fuses the color signals and the brightness signal to obtain the fused image may include:

step c1, converting the color signals into YUV signals, wherein the YUV signals are luminance and chrominance signals;

step c2, extracting chrominance UV components in the YUV signals;

step c3, combining the UV components with the brightness signal to form new YUV signals; and step c4, determining the new YUV signals as the fused image, or converting the new YUV signals into RGB signals and determining the resulting RGB signals as the fused image.

It can be appreciated that in the YUV format, "Y" represents Luminance or Luma, i.e., the value of the gray level; and "U" and "V" represent Chrominance or chroma which describe the color and saturation of the image and are used to specify the color of a pixel. After extracting the UV components and before combining the UV components with the brightness signal, the UV components may be subjected to noise reduction to remove color noise, which can improve the image quality of the fused image. The method for the noise reduction may include but is not limited to Gaussian filtering. It should be emphasized that the conversion between the YUV signals and the color signals can be implemented by any existing algorithm in the related art, and the extraction of the UV components from the YUV signals and the combination of the UV components and the brightness signal can be implemented by related techniques.

It should be emphasized that the above specific implementation that the image processor 130 fuses the color signals and the brightness signal to obtain the fused image is only an example and should not be construed as limiting the embodiments of the present application. In addition, it can be appreciated that the image processor 130 may first optimize the color signals and the brightness signal, and then fuse the optimized color signals and the optimized brightness signal to obtain the fused image. For example, the optimization of the color signals may include performing low-pass filtering on the color signals to reduce the noise of the color signals. The optimization of the brightness signal may include performing high-pass filtering on the brightness signal to implement edge enhancement of the brightness signal.

It can be seen, in the embodiments of the present application, the light acquisition device filters the spectrum component of the first predetermined wavelength range from the incident light, so that the portion in which there is a large difference between the quantum efficiencies of the channels at the near-infrared band is filtered out. This can simplify the calculations performed by the image processor to remove the infrared component from the color signals, and thus improve the efficiency of the image fusion. Moreover, the image fusion apparatus provided by the embodiment of the present application uses the image sensor having the four types of photosensitive channels to acquire images. Compared to means that requires special design on its optical system to simultaneously acquire infrared light and visible light, the complexity of the structure of the image fusion apparatus is greatly reduced, allowing the image fusion apparatus to be widely used.

In order to filter the spectrum component of the first predetermined wavelength range from the incident light, in a specific implementation, the light acquisition device 110 may include a band-stop filter and an optical lens of a first type.

The optical lens of the first type is configured to transmit the incident light to the band-stop filter in a full spectrum transmission manner.

The band-stop filter is configured to filter the spectrum component of the first predetermined wavelength range from the light transmitted from the optical lens of the first type to obtain the target light.

Specifically, for example, the band-stop filter may be a coating integrated on the optical lens of the first type by coating; or the band-stop filter may be a patch disposed on the optical lens of the first type. Moreover, it should be noted that the full spectrum transmission manner is a manner in which the spectrum components of all bands are transmitted, that is, no spectrum is filtered out. Since the optical lens of the first type transmits the incident light to the band-stop filter in a full-spectrum transmission manner, the light transmitted by the optical lens of the first type has a band same as the band of the incident light. That is, the optical lens of the first type does not filter the spectrum component of any band.

In order to filter the spectrum component of the first predetermined wavelength from the incident light, in another implementation, the light acquisition device 110 includes an optical lens of a second type, which is capable of filtering the spectrum component of the first predetermined wavelength range.

It should be emphasized that the specific implementation that the light acquisition device 110 filters the spectrum component of the first predetermined wavelength range from the incident light is merely an example, which do not constitute any limitation to the embodiments of the present application.

Optionally, in a specific implementation, while the image sensor 120 converts the target light into the image signal, in a second predetermined wavelength range of the infrared band, the differences between responsivities of the RGB channels are lower than a second predetermined threshold, to ensure the precise restoration of color signals after the infrared component has been removed. This improves the quality of the image fusion. The second predetermined wavelength range is [T3, T4], where T4 is greater than T3, T3 is greater than or equal to 750 nm, and T4 is less than or equal to 1100 nm. For example, as shown in FIG. 5, while the image sensor 120 converts the target light into the image signal, the responsivities of the RGB channels in the band at the right of the gray region satisfy a certain constraint. It should be emphasized that the second predetermined threshold may be set depending on actual conditions, which is not limited herein.

It should be noted that, the image sensor 120 may have different structures, to allow the differences between the responsivities of the RGB channels in the second predetermined wavelength range of the infrared band to be lower than the second predetermined threshold, which are not limited herein. For example, a particular optical element such as a filter may be added to the image sensor.

Optionally, the process of converting the target light into the image signal may include that the image sensor 120 performs multiple-exposures acquisition in one frame time. In an implementation, one or multiple exposures can be manually set for the image sensor 120.

Moreover, for multiple-exposures acquisition in one frame time for the image sensor 120, the process that the image processor 130 analyzes the image signal into the color signals and the brightness signal that is photosensitive to the infrared band may include:

analyzing an image signal generated by using an exposure of a first type to obtain the color signals; and analyzing an image signal generated by using an exposure of a second type to obtain the brightness signal that is photosensitive to the infrared band.

The exposure of the first type and the exposure of the second type may or may not have same exposure duration. When the exposure duration of the exposure of the first type is different from that of the exposure of the second type, the exposure duration of the exposure of the first type may be less than the exposure duration of the exposure of the second type. Of course, the exposure duration of the exposure of the first type may also be greater than the exposure duration of the exposure of the second type.

Specifically, the operation of analyzing an image signal generated by using the exposure of the first type to obtain the color signals may include:

performing an interpolation operation on the IR channel of the image signal generated by using the exposure of the first type, to obtain a value of an IR channel at each pixel position;

traversing the image signal generated by using the exposure of the first type, and subtracting a value of an IR parameter for a pixel position from the value of a traversed R channel, G channel, or B channel, where the value of the IR parameter is the product of the value of the IR channel at the pixel position and a preset correction value; and performing interpolation operations on the R channel, the G channel and the B channel of the image signal generated by using the exposure of the first type respectively, to generate the color signals having the resolution same as the input resolution.

Correspondingly, the operation of analyzing the image signal generated by using the exposure of the second type to obtain the brightness signal that is photosensitive to the infrared band may specifically include:

performing an interpolation operation on the IR channel of the image signal generated by using the exposure of the second type, to generate a brightness signal that has a resolution same as the input resolution and is photosensitive to the infrared band. The input resolution is the resolution of the image signal.

The interpolation of any of the channels involved in above processes may be performed with a bilinear interpolation or a bicubic interpolation algorithm, which is, of course, not limited thereto.

Moreover, in order to ensure sufficient infrared signals, an image signal generated with a short exposure may be analyzed to obtain the color signals and an image signal formed with a long exposure may be analyzed to obtain the brightness signal, so as to improve the image quality. At this point, the exposure duration of the exposure of the first type is less than the exposure duration of the exposure of the second type.

Figure 6:
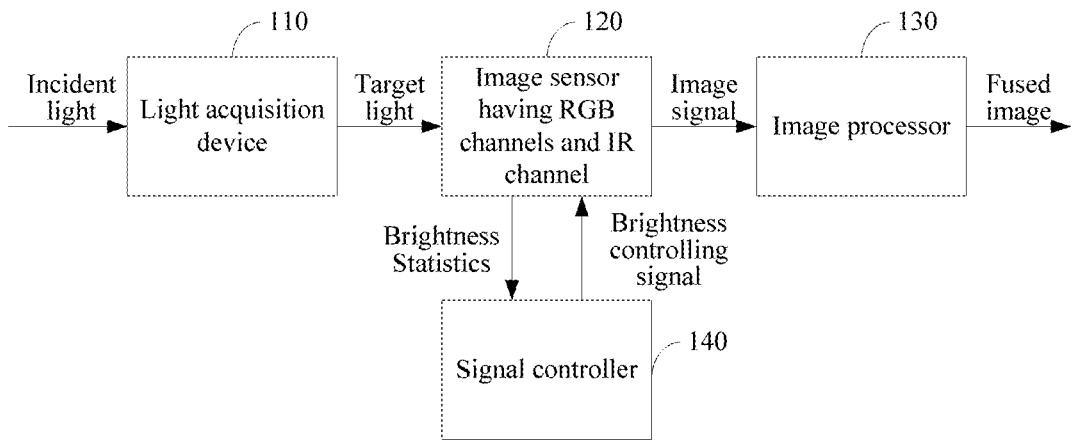
FIG. 6 is another diagram schematically showing the structure of an image fusion apparatus provided by the first aspect of the present application.

Optionally, on the basis of the embodiment shown in FIG. 1, an image fusion apparatus provided by an embodiment of the present application, as shown in FIG. 6, may further include:

a signal controller 140, configured to control the image sensor 120 to generate an image signal that meets a predetermined brightness requirement.

Specifically, in an implementation, the signal controller may be specifically configured to analyze brightness of image signals generated by the image sensor 120, and control the image sensor 120 according to the analyzing result to generate image signals that meet the predetermined brightness requirement. Specifically, the signal controller 140 may perform the following steps: (a) generating an initial brightness control signal and transmitting it to the image sensor 120; (b) calculating an average brightness of the image signals generated by the image sensor 120, that is, averaging that of all the pixel values; and (c) calculating the difference between the average brightness and a reference value, and if the difference is within a predetermined range, maintaining the value of the current brightness control signal unchanged; otherwise, if the difference is outside the predetermined range and greater than the reference value, lowering the value of the brightness control signal; and if the difference is outside the predetermined range and less than the reference value, increasing the value of the brightness control signal.

Of course, in another implementation, the signal controller 140 can periodically send a predetermined brightness control signal to the image sensor 120. The predetermined brightness control signal is a control signal set according to a predetermined brightness requirement.

It can be appreciated that the signal controller 140 can also be configured to control the image sensor 120 to switch between one-exposure acquisition and multiple-exposures acquisition. It should be emphasized that the specific implementation that the signal controller 140 controls the image sensor 120 to generate image signals that meet the predetermined brightness requirement is merely an example and should not be construed as limiting the embodiments of the present application.

Figure 7:
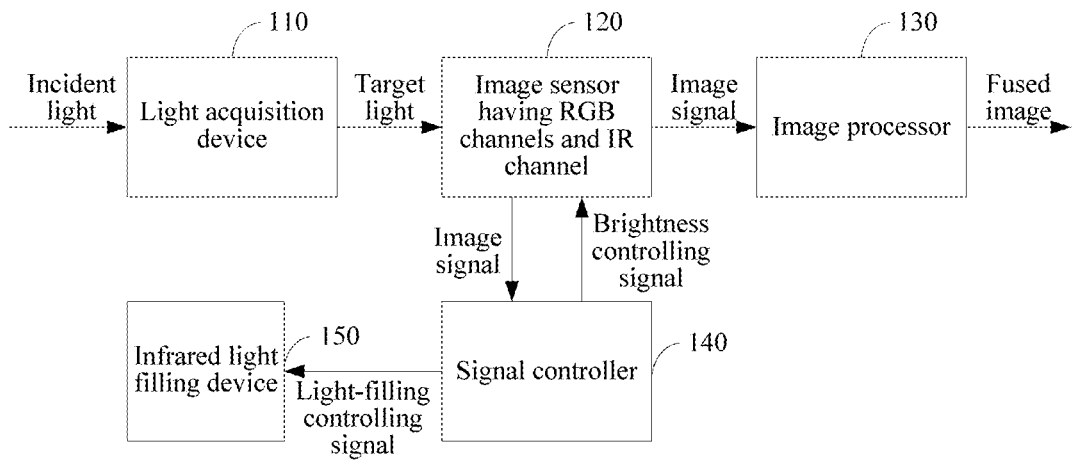
FIG. 7 is yet another diagram schematically showing the structure of an image fusion apparatus provided by the first aspect of the present application.

Optionally, in an environment with low illumination, it is possible to compensate for the low illumination by illuminating the environment, to ensure that the fused image has ideal brightness and a high signal to noise ratio. That means to provide infrared light. Based on this concept, an image fusion apparatus provided by an embodiment of the present application may further include an infrared light filling device 150, as shown in FIG. 7.

The signal controller 140 is further configured to control the infrared light filling device 150 to fill infrared light for the image sensor.

Specifically, in a specific implementation, the signal controller 140 can detect the gain value g of the brightness control signal. When g is greater than a threshold T1, a light-filling control signal is set to 1 to enable the infrared light filling. When g is smaller than a threshold T2, the light-filling control signal is set to 0 to disable the infrared light filling. T1 is greater than T2.

It should be emphasized that the specific values of T1 and T2 may be set depending on actual conditions, which are not limited herein. In addition, the above specific implementation that the signal controller 140 controls the infrared light filling device 150 to fill infrared light for the image sensor is merely for the purpose of illustration and should not be construed as limiting the embodiments of the present application.

In the second aspect, an embodiment of the present application provides an image fusion apparatus, to solve the problem of a low efficiency of image fusion due to a large amount of calculation performed by an image processor for removing an infrared component from color signals.

Figure 8:
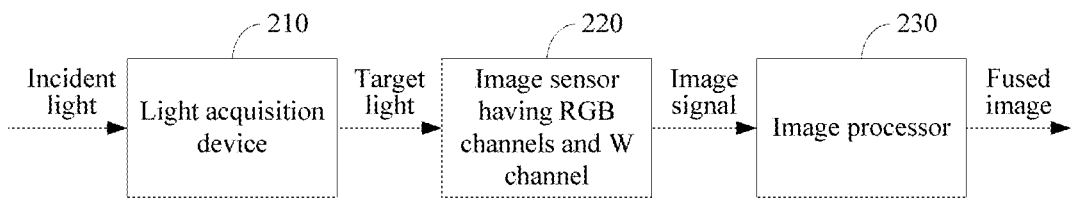
FIG. 8 is a diagram schematically showing the structure of an image fusion apparatus provided by the second aspect of the present application.

As shown in FIG. 8, the image fusion apparatus provided by the embodiment of the present application may include:

a light acquisition device 210, an image processor 230, and an image sensor 220 having four types of photosensitive channels. The four types of photosensitive channels include red, green and blue RGB channels and a full-band W channel.

The light acquisition device 210 is configured to filter a spectrum component of a first predetermined wavelength range from incident light to obtain target light. The first predetermined wavelength range is a spectrum wavelength range in which a difference between the responsivities of the RGB channels and the responsivity of the W channel in the image sensor 220 at an infrared band is greater than a first predetermined threshold.

The image sensor 220 is configured to convert the target light into an image signal through the RGB channels and the W channel.

The image processor 230 is configured to analyze the image signal into color signals and a brightness signal, and fuse the color signals and the brightness signal to obtain a fused image. Such a color signal is a signal obtained based on the R channel, the G channel, or the B channel.

It should be emphasized that the spectrum component of the first predetermined wavelength range is filtered out from the incident light, such that the portion in which there is a large difference between the quantum efficiencies of the channels at the near-infrared band is filtered out. This can simplify the operations performed by the image processor to remove the infrared component from the color signals, and thus improve the efficiency of the image fusion. The value of the first predetermined threshold may be set depending on actual conditions, and is not limited herein. It should be emphasized that, as long as any of three differences, i.e., the difference between the value of the R channel and the value of the W channel, the difference between the value of the G channel and the value of the W channel, and the difference between the value of the B channel and the value of the W channel, is greater than the first predetermined threshold, the light acquisition device 210 will filter the spectrum component of a corresponding wavelength range.

Optionally, in order to allow the infrared band and the visible band to pass, the first predetermined wavelength range may be [T1, T2]. The value of T1 is in the range of [600 nm, 800 nm], and the value of T2 is in the range of [750 nm, 1100 nm]. It can be appreciated that, with the additional function of filtering the spectrum component of the predetermined wavelength range from the incident light, the spectrum component in which there is a large difference between the responsivities of the RGB channels and the responsivity of the W channel in the image sensor 220, at the infrared band (650-1100 nm), is filtered out. Thereby, the color signals and the brightness signal can be precisely restored with simplified calculations from the image signal generated by the image sensor 220. As shown in FIG. 13, the gray portion is the spectrum portion that needs to be filtered out. In FIG. 13, W represents the full-band spectrum signal, R represents the red light signal, G represents the green light signal, and B represents the blue light signal. It should be emphasized that FIG. 13 merely shows an example, which will not limit the embodiments of the present application. Due to manufacturing processes or the like, the actual filtered curves usually have slopes not as steep as those shown in FIG. 13.

Those skilled in the art can appreciate that the Bayer pattern is a data format for image sensors. FIG. 2 shows a schematic diagram of the Bayer pattern, which outputs the red, green, and blue dot matrix information in a mosaic manner. An image sensor based Bayer pattern has only three channels, i.e., RGB channels, and cannot obtain the infrared spectrum component. Therefore, in order to obtain a fused image from a visible light image and an infrared image, a prism beam splitter, different optical sensors and the like are required to simultaneously acquire infrared light and visible light, which results in a complex structure. In order to decrease the complexity of the structure, an image sensor having four types of photosensitive channels is employed in the embodiments of the present application, such that color signals and a brightness signal can be obtained from an image signal acquired by one single image sensor. For ease of explanation, the image sensor having the red, green and blue RGB channels and the full-band channel provided by the embodiments of the present application is referred to as an RGBW image sensor.

Figures 9, 10:
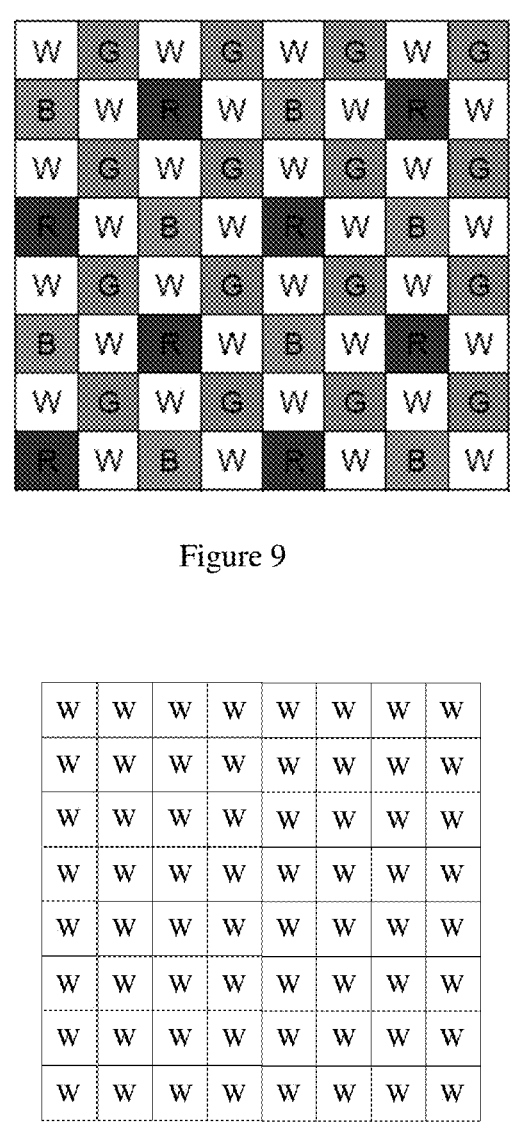

FIG. 9 shows schematic diagram of an array corresponding to the RGBW image sensor. As shown in FIG. 9, the RGBW image sensor includes four types of photosensitive channels, namely, RGB channels and W channel. Specifically, the W channel is a channel photosensitive to all bands. Since the W channel is photosensitive to all of the bands, it is photosensitive to the infrared band, and can be used as a brightness channel. The RGB channels are photosensitive to both visible band and infrared band, and are primarily used to obtained visible light. It should be emphasized that the array shown in FIG. 9 is merely for the purpose of illustration and should not be construed as limiting the embodiments of the present application. In addition, those skilled in the art can appreciate that, in practical applications, there are various arrays for the RGBW image sensor, all of which can be applied to the embodiments of the present application.

It should be noted that the color signals can be generated by subtracting the value of an IR parameter for pixel position from the value of the R channel, the G channel, or the B channel. The value of the IR parameter is the product of an IR value for the pixel position and a second preset correction value. The IR value is a value calculated using a predetermined formula. It can be appreciated that subtracting the value of the IR parameter for pixel position respectively from the values of the traversed R channel, G channel, and B channel, namely removing the infrared component from the color signals, can avoid the crosstalk between the infrared component and the RGB signal components of the color signals, thereby improving the quality of the image obtained under low illumination. In addition, it should be emphasized that the first preset correction value and the second preset correction value can be set depending on actual conditions. For example, the first preset correction value can be generally set to 2. Of course, the first preset correction value can be set to any integer or fraction ranging from 0 to 1024 depending on actual conditions. Those skilled in the art can appreciate that the value of the first preset correction value is not limited thereto. Similarly, the second preset correction value can be generally set to 1. Of course, the second preset correction value can also be set to any integer or fraction ranging from 0 to 1024 depending on actual conditions. Those skilled in the art can appreciate that the value of the second preset correction value is not limited thereto. Optionally, in a specific implementation, the process that the image processor 230 analyzes the image signal into the color signals and the brightness signal includes:

step d1, performing an interpolation operation on the W channel of the image signal to generate a brightness signal that has a resolution same as an input resolution, wherein the input resolution is a resolution of the image signal;

step d2, performing interpolation operations on the R channel, the G channel and the B channel of the image signal respectively, to generate an image signal of each of the channels which has a resolution same as the input resolution;

step d3, traversing the image signal of each of the channels, and calculating an IR value for each pixel position by a predetermined formula, which is (R+G+B−W)/n, wherein R is the value of the R channel of the pixel, G is the value of the G channel of the pixel, B is the value of the B channel of the pixel, W is the value of the W channel of the pixel, and n is a first preset correction value;

step d4, traversing the image signal of each of the channels, and subtracting a value of an IR parameter for a pixel position from a value of the traversed R channel, G channel, or B channel to generate a color signal, where the value of the IR parameter is the product of the IR value for the pixel position and a second preset correction value.

Taking the array shown in FIG. 9 as an example again, each small square corresponds to one pixel, and the resolution of the image signal generated by the RGBW image sensor is 8*8, as shown in FIG. 9. Since the interpolation, operation of the W channel of the image signal generates the brightness signal that has the resolution same as the input resolution, the brightness signal generated by the interpolation of the W channel of the image signal shown in FIG. 9 also has a resolution of 8*8. The result of the interpolation of the W channel may be as shown in FIG. 10. Moreover, the interpolation of the W channel of the image signal may be implemented by an interpolation algorithm such as bilinear interpolation or bicubic interpolation, which is not limited herein. It should be emphasized that the resolution of the image signal generated by the RGBW image sensor is related to the structure of the array. The resolution of 8*8 is only the resolution corresponding to the RGBW image sensor having a structure of array shown in FIG. 9, which should not limit the embodiments of the present application.

In addition, similarly, the R channel, the G channel, and the B channel of the image signal are respectively interpolated and an image signal of each of the channels has a resolution same as the input resolution is thus generated. Therefore, for example, the image signal of each of the channels generated by interpolating the R channel, the G channel, and the B channel of the image signal shown in FIG. 9 has a resolution of 8*8. Moreover, the respective interpolation algorithms used for implementing the interpolation of the R channel, the G channel, or the B channel of the image signal may be bilinear interpolation or bicubic interpolation. The interpolation algorithm used for implementing the interpolation of the W channel may or may not be same as that used for the interpolation of the RGB channels, which is not limited herein.

It should be emphasized that the above specific implementation that the image processor 230 analyzes the image signal into the color signals and the brightness signal is merely an example and should not be construed as limitation of the embodiments of the present application.

It can be appreciated that after the color signals and the brightness signal are obtained, there are many specific implementations for the image processor 230 to fuse the color signals and the brightness signal to obtain the fused image. Two of the implementations will be described in detail below.

In a specific implementation, the process that the image processor 230 fuses the color signals and the brightness signal to obtain the fused image includes:

step e1, calculating an auxiliary value Y for each pixel according to the color signals, as Y=(R*w1+G*w2+B*w3)/(w1+w2+w3), where R is the value of the R channel of the pixel, G is the value of the G channel of the pixel, B is the value of the B channel of the pixel, and w1, w2 and w3 are weights;

step e2, calculating a ratio of the value of each channel of the color signals to the auxiliary value Y to obtain reference channel values K1, K2, and K3 for the pixel, which are calculated as K1=R/Y, K2=G/Y, K3=B/Y;

step e3, performing chroma noise reduction on the reference channel values K1, K2, and K3; and step e4, fusing a brightness value Y' of the pixel and the reference channel values K1-K3 subjected to the chroma noise reduction, to generate values of three fused channels (RGB channels) R', G' and B' and to obtain the fused image; which are calculated as R'=K1*Y'; G'=K2*Y'; B'=K3*Y'.

The embodiments of the present application do not limit the values of the weights w1, w2, and w3. The method for performing the chroma noise reduction may include, but is not limited to, Gaussian filtering. For example, assuming w1=1, w2=1 and w3=1, then Y=(R+G+B)/3.

In another specific implementation, the process that the image processor 230 fuses the color signals and the brightness signal to obtain the fused image includes:

step f1, converting the color signals into YUV signals, wherein the YUV signals are luminance and chrominance signals;

step f2, extracting chrominance UV components in the YUV signals;

step f3, combining the UV components with the brightness signal to form new YUV signals; and step f4, determining the new YUV signals as the fused image, or converting the new YUV signals into RGB signals and determining the resulting RGB signals as the fused image.

It can be appreciated that for the YUV format, "Y" represents Luminance (or Luma), i.e., the value of the gray level; and "U" and "V" represents Chrominance (or chroma) which describe the color and saturation of the image and are used to specify the color of a pixel. After extracting the UV components and before combining the UV components and the brightness signal, the UV components may be subjected to noise reduction to remove chroma noise, which improves the image quality of the fused image. The method for the noise reduction may include but is not limited to Gaussian filtering. It should be emphasized that the conversion between the YUV signals and the color signals can be implemented by any of existing conversion algorithms in the related art, and the extraction of the UV components from the YUV signals and the combination of the UV components with the brightness signal can be implemented by related techniques.

It is to be emphasized that the above specific implementation that the image processor 230 fuses the color signals and the brightness signal to obtain the fused image is only an example and should not be construed as limiting the embodiments of the present application. In addition, it can be appreciated that the image processor 230 may first optimize the color signals and the brightness signal, and then fuse the optimized color signals and the optimized brightness signal to obtain the fused image. For example, the optimization of the color signals may include performing low-pass filtering on the color signals to reduce the noise of the color signals. The optimization of the brightness signal may include performing high-pass filtering processing on the brightness signal to implement edge enhancement of the brightness signal.

It can be seen, in the embodiments of the present application, the light acquisition device filters the spectrum component of the first predetermined wavelength range from the incident light, so that the portion in which there is a large difference between the quantum efficiencies of the channels at the near-infrared band is filtered out. This can simplify the calculations performed by the image processor to remove the infrared component from the color signals, and thus improve the efficiency of the image fusion. Moreover, the image fusion apparatus provided by the embodiment of the present application uses the image sensor having the four types of photosensitive channels to acquire images. Compared to means that requires special design on its optical system to simultaneously acquire infrared light and visible light, the complexity of the structure of the image fusion apparatus is greatly reduced, allowing the image fusion apparatus to be widely used.

In order to filter the spectrum component of the first predetermined wavelength range from the incident light, in a specific implementation, the light acquisition device 210 may include a band-stop filter and an optical lens of a first type.

The optical lens of the first type is configured to transmit the incident light to the band-stop filter in a full spectrum transmission manner.

The band-stop filter is configured to filter the spectrum component of the first predetermined wavelength range from the light transmitted from the optical lens of the first type to obtain the target light.

Specifically, for example, the band-stop filter may be a coating integrated on the optical lens of the first type by coating; or the band-stop filter may be a patch disposed on the optical lens of the first type. Moreover, it should be noted that the full spectrum transmission manner is a manner in which the spectrum components of all bands are transmitted, that is, no spectrum is filtered out. Since the optical lens of the first type transmits the incident light to the band-stop filter in a full-spectrum transmission manner, the light transmitted by the optical lens of the first type has a band same as the band of the incident light. That is, the optical lens of the first type does not filter the spectrum component of any band. In order to filter the spectrum component of the first predetermined wavelength from the incident light, in another implementation, the light acquisition device 210 includes an optical lens of a second type, which is capable of filtering the spectrum component of the first predetermined wavelength range.

It should be emphasized that the specific implementation that the light acquisition device 210 filters the spectrum component of the first predetermined wavelength range from the incident light is merely an example, which do not constitute any limitation to the embodiments of the present application. Optionally, in a specific implementation, while the image sensor 220 converts the target light into the image signal, in a second predetermined wavelength range of the infrared band, the differences between responsivities of the RGB channels are lower than a second predetermined threshold, to ensure the precise restoration of color signals after the infrared component has been removed. This improves the quality of the image fusion. The second predetermined wavelength range is [T3, T4], where T4 is greater than T3, T3 is greater than or equal to 750 nm, and T4 is less than or equal to 1100 nm. For example, as shown in FIG. 13, while the image sensor 220 converts the target light into the image signal, the responsivities of the RGB channels in the band at the right of the gray region satisfy a certain constraint. It should be emphasized that the second predetermined threshold may be set depending on actual conditions, which is not limited herein.

It should be noted that, the image sensor 220 may have different structures, to allow the differences between the responsivities of the RGB channels in the second predetermined wavelength range of the infrared band to be lower than the second predetermined threshold, which are not limited herein. For example, a particular optical element such as a filter may be added to the image sensor.

Optionally, the process of converting the target light into the image signal may include that the image sensor 220 performs multiple-exposures acquisition in one frame time. In an implementation, one or multiple exposures can be manually set for the image sensor 220.

Moreover, for multiple-exposures acquisition in one frame time for the image sensor 220, the process that the image processor 230 analyzes the image signal into the color signals and the brightness signal may include:

analyzing an image signal generated by using an exposure of a first type to obtain the color signals; and analyzing an image signal generated by using an exposure of a second type to obtain the brightness signal.

The exposure of the first type and the exposure of the second type may or may not have same exposure duration. When the exposure duration of the exposure of the first type is different from that of the exposure of the second type, the exposure duration of the exposure of the first type may be less than the exposure duration of the exposure of the second type. Of course, the exposure duration of the exposure of the first type may also be greater than the exposure duration of the exposure of the second type.

Specifically, the operation of analyzing an image signal generated by using the exposure of the first type to obtain the color signals may include:

performing interpolation operations on the R channel, the G channel and the B channel of the image signal generated by using the exposure of the first type respectively, to generate an image signal of each of the channels which has a resolution same as the input resolution;

traversing the image signal of each of the channels, and calculating an IR value for each pixel position by a predetermined formula (R+G+B−W)/n, where R is the value of the R channel of the pixel, G is the value of the G channel of the pixel, B is the value of the B channel of the pixel, W is the value of the W channel of the pixel, and n is a first preset correction value; and traversing the image signal of each of the channels, and subtracting the value of an IR parameter for a pixel position from the value of the traversed R channel, G channel, or B channel to generate a color signal, wherein the value of the IR parameter is the product of the IR value for the pixel position and a second preset correction value.

Correspondingly, the operation of analyzing the image signal generated by using the exposure of the second type to obtain the brightness signal may specifically include:

performing an interpolation operation on the W channel of the image signal generated by the exposure of the second type to generate the brightness signal that has a resolution same as an input resolution. The input resolution is the resolution of the image signal.

The interpolation of any of the channels involved in the above processes may be implemented by a bilinear interpolation or a bicubic interpolation, which is, of course, not limited thereto.

Figure 11:
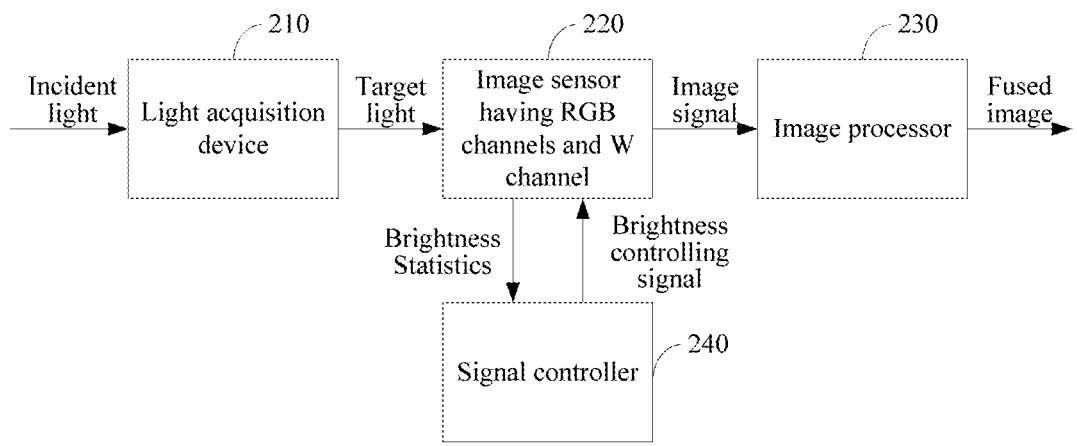
FIG. 11 is another diagram schematically showing the structure of an image fusion apparatus provided by the second aspect of the present application.

Optionally, on the basis of the embodiment shown in FIG. 8, an image fusion apparatus provided by an embodiment of the present application, as shown in FIG. 11, may further include:

a signal controller 240, configured to control the image sensor 220 to generate an image signal that meets a predetermined brightness requirement.

Specifically, in an implementation, the signal controller 240 may be specifically configured to analyze brightness of image signals generated by the image sensor 220, and control the image sensor 220 according to the analyzing result to generate image signals that meet the predetermined brightness requirement. Specifically, the signal controller 240 may perform the following steps: (a) generating an initial brightness control signal and transmitting it to the image sensor 220; (b) calculating an average brightness of the image signals generated by the image sensor 220, that is, averaging that of all the pixel values; and (c) calculating the difference between the average brightness and a reference value, and if the difference is within a predetermined range, maintaining the value of the current brightness control signal unchanged; otherwise, if the difference is outside the predetermined range and greater than the reference value, lowering the value of the brightness control signal; and if the difference is outside the predetermined range and less than the reference value, increasing the value of the brightness control signal.

Of course, in another implementation, the signal controller 240 can periodically send a predetermined brightness control signal to the image sensor 220. The predetermined brightness control signal is a control signal set according to a predetermined brightness requirement.

It can be appreciated that the signal controller 240 can also be configured to control the image sensor 220 to switch between one-exposure acquisition and multiple-exposures acquisition. It should be emphasized that the specific implementation that the signal controller 240 controls the image sensor 220 to generate image signals that meet the predetermined brightness requirement is merely an example and should not be construed as limiting the embodiments of the present application.

Figure 12:
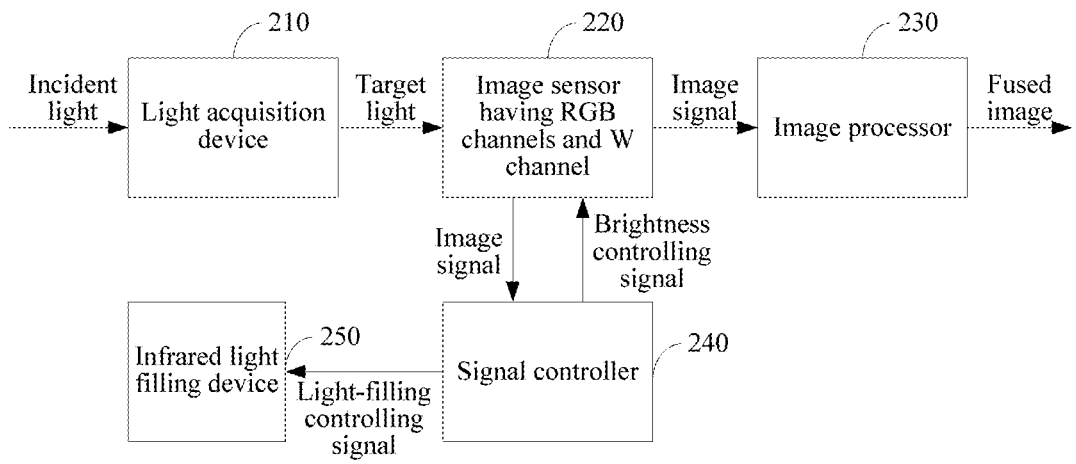
FIG. 12 is yet another diagram schematically showing the structure of an image fusion apparatus provided by the second aspect of the present disclosure.

Optionally, in an environment with low illumination, it is possible to compensate for the low illumination by illuminating the environment, to ensure that the fused image has ideal brightness and a high signal to noise ratio. That means to provide infrared light. Based on this concept, an image fusion apparatus provided by an embodiment of the present application may further include an infrared light filling device 250, as shown in FIG. 12.

The signal controller 240 is further configured to control the infrared light filling device 250 to fill infrared light for the image sensor.

Specifically, in a specific implementation, the signal controller 240 can detect the gain value g of the brightness control signal. When g is greater than a threshold T1, a light-filling control signal is set to 1 to enable the infrared light filling. When g is smaller than a threshold T2, the light-filling control signal is set to 0 to disable the infrared light filling. T1 is greater than T2.

It should be emphasized that the specific values of T1 and T2 may be set depending on actual conditions, which are not limited herein. In addition, the above specific implementation that the signal controller 240 controls the infrared light filling device 250 to fill infrared light for the image sensor is merely for the purpose of illustration and should not be construed as limiting the embodiments of the present application.

In the third aspect, based on the above image fusion apparatus provided by the first aspect, an embodiment of the present application further provides an image fusion method. The method is applicable to the image fusion apparatus provided by the first aspect of the embodiments of the present application. The image fusion apparatus has four types of photosensitive channels including red, green and blue RGB channels and an infrared IR channel. As shown in FIG. 14, the method includes the steps S1401-S1403.

Step S1401, filtering a spectrum component of a first predetermined wavelength range from incident light to obtain target light; wherein the first predetermined wavelength range is a spectrum wavelength range in which a difference between responsivities of the RGB channels and a responsivity of the IR channel in an image sensor of the image fusion apparatus at an infrared band is greater than a first predetermined threshold.

Step S1402, converting the target light into an image signal through the RGB channels and the IR channel.

The specific implementation of converting the target light into an image signal through the RGB channels and the IR channel can be implemented by any approaches in the related art, which is not limited herein.

Step S1403, analyzing the image signal into color signals and a brightness signal that is photosensitive to the infrared band, and fusing the color signals and the brightness signal to obtain a fused image. A color signal is a signal obtained based on the R channel, the G channel, or the B channel.

For the specific structure of the image fusion apparatus, one may refer to description for the embodiments illustrated in the first aspect, and details will not be described again herein.

It should be emphasized that the spectrum component of the first predetermined wavelength range is filtered out from the incident light, such that the portion in which there is a large difference between the quantum efficiencies of the channels at the near-infrared band is filtered out. This can simplify the operations performed by the image processor to remove the infrared component from the color signals, and thus improve the efficiency of the image fusion. The value of the first predetermined threshold may be set depending on actual conditions, and is not limited herein. Optionally, in order to allow the infrared band and the visible band to pass, the first predetermined wavelength range may be [T1, T2]. The value of T1 is in the range of [600 nm, 800 nm], and the value of T2 is in the range of [750 nm, 1100 nm].

It should be noted that the color signals can be generated by subtracting the value of an IR parameter for a pixel position from the value of the R channel, the G channel, or the B channel. The value of the IR parameter is the product of the value of the IR channel at the pixel position and a preset correction value. It can be appreciated that subtracting the value of the IR parameter for the pixel position respectively from the values of the R channel, G channel or B channel, namely removing the infrared component from the color signals, can avoid the crosstalk between the infrared component and the RGB signal components of the color signals, thereby improving the quality of the image obtained under low illumination. It should be emphasized that the preset correction value can be set depending on actual conditions. For example, the preset correction value can be generally set to 1. Of course, the preset correction value can also be set to any integer or fraction ranging from 0 to 1024 depending on actual conditions. Those skilled in the art can appreciate that the value of the preset correction value is not limited thereto.

Specifically, in a specific implementation, the step of analyzing the image signal into the color signals and the brightness signal that is photosensitive to the infrared band may include:

step a1, performing an interpolation operation on the IR channel of the image signal to generate a brightness signal that has a resolution same as an input resolution and is photosensitive to the infrared band, wherein the input resolution is a resolution of the image signal;

step a2, traversing the image signal and subtracting the value of an IR parameter for a pixel position from the value of the traversed R channel, G channel, or B channel, wherein the value of the IR parameter is the product of a value of the IR channel at the pixel position and a preset correction value; and step a3, performing interpolation operations on the R channel, the G channel and the B channel of the image signal respectively, to generate the color signals having a resolution same as the input resolution.

For a detailed description of the steps a1-a3 of the embodiment, reference may be made to the corresponding descriptions for the image fusion apparatus embodiments provided by the first aspect, and details will be not described here.

It should be noted that there are several specific implementations of fusing the color signals and the brightness signal to obtain the fused image. Two of the implementations will be described in detail below.

In a specific implementation, the step of fusing the color signals and the brightness signal to obtain the fused image may include:

step b1, calculating an auxiliary value Y for each pixel according to the color signals, as $Y=(R*w1+G*w2+B*w3)/(w1+w2+w3)$, wherein R is a value of the R channel of the pixel, G is a value of the G channel of the pixel, B is a value of the B channel of the pixel, and w1, w2 and w3 are weights;

step b2, calculating a ratio of the value of each channel of the color signals to the auxiliary value Y to obtain reference channel values K1, K2, and K3 for the pixel, which are $K1=R/Y$, $K2=G/Y$, $K3=B/Y$;

step b3, performing chroma noise reduction on the reference channel values K1, K2, and K3; and step b4, fusing a brightness value Y' of the pixel and the reference channel values K1-K3 subjected to the chroma noise reduction, to generate values of fused RGB channels R', G' and B' and to obtain the fused image; wherein $R'=K1*Y'$; $G'=K2*Y'$; $B'=K3*Y'$.

For a detailed description of the steps b1-b4 of the present embodiment, reference may be made to the corresponding descriptions for the image fusion apparatus embodiments provided by the first aspect, and details will be not described here.

Specifically, in another specific implementation, the step of fusing the color signals and the brightness signal to obtain the fused image include:

step c1, converting the color signals into YUV signals, wherein the YUV signals are luminance and chrominance signals;

step c2, extracting chrominance UV components in the YUV signals;

step c3, combining the UV components with the brightness signal to form new YUV signals; and step c4, determining the new YUV signals as the fused image, or converting the new YUV signals into RGB signals and determining the resulting RGB signals as the fused image.

For a detailed description of the steps c1-c4 of the present embodiment, reference may be made to the corresponding descriptions for the image fusion apparatus embodiments provided by the first aspect, and details will be not described here.

Further, in converting the target light into the image signal, multiple-exposures acquisition may be performed in one frame time. One or multiple exposures can be manually set, which is of course not limited thereto.

Moreover, for the image fusion apparatus performing multiple-exposures acquisition in one frame time, the step of analyzing the image signal into the color signals and the brightness signal that is photosensitive to the infrared band may include:

analyzing an image signal generated by using an exposure of a first type to obtain the color signals; and analyzing an image signal generated by using an exposure of a second type to obtain the brightness signal that is photosensitive to the infrared band.

The exposure of the first type and the exposure of the second type may or may not have same exposure duration. When the exposure duration of the exposure of the first type is different from that of the exposure of the second type, the exposure duration of the exposure of the first type may be less than the exposure duration of the exposure of the second type. Of course, the exposure duration of the exposure of the first type may also be greater than the exposure duration of the exposure of the second type.

Specifically, the step of analyzing an image signal generated by using the exposure of the first type to obtain the color signals may include:

performing an interpolation operation on the IR channel of the image signal generated by using the exposure of the first type, to obtain a value of an IR channel at each pixel position;

traversing the image signal generated by using the exposure of the first type, and subtracting a value of an IR parameter for a pixel position from the value of a traversed R channel, G channel, or B channel, where the value of the IR parameter is the product of the value of the IR channel at the pixel position and a preset correction value; and performing interpolation operations on the R channel, the G channel and the B channel of the image signal generated by using the exposure of the first type respectively, to generate the color signals having the resolution same as the input resolution.

Correspondingly, the step of analyzing the image signal generated by using the exposure of the second type to obtain the brightness signal that is photosensitive to the infrared band may specifically include:

performing an interpolation operation on the IR channel of the image signal generated by using the exposure of the second type, to generate a brightness signal that has a resolution same as the input resolution and is photosensitive to the infrared band. The input resolution is the resolution of the image signal.

The interpolation of any of the channels involved in above processes may be performed with a bilinear interpolation or a bicubic interpolation algorithm, which is, of course, not limited thereto.

Moreover, in order to ensure sufficient infrared signals, an image signal generated with a short exposure may be analyzed to obtain the color signals and an image signal formed with a long exposure may be analyzed to obtain the brightness signal, so as to improve the image quality. At this point, the exposure duration of the exposure of the first type is less than the exposure duration of the exposure of the second type.

The image fusion method provided by the embodiments of the present application can reduce the amount of calculation for removing the infrared component from the color signals, which improves the efficiency of image fusion while achieves the objective of capturing a dual-band image through an image fusion apparatus having a simple structure.

Figure 15:
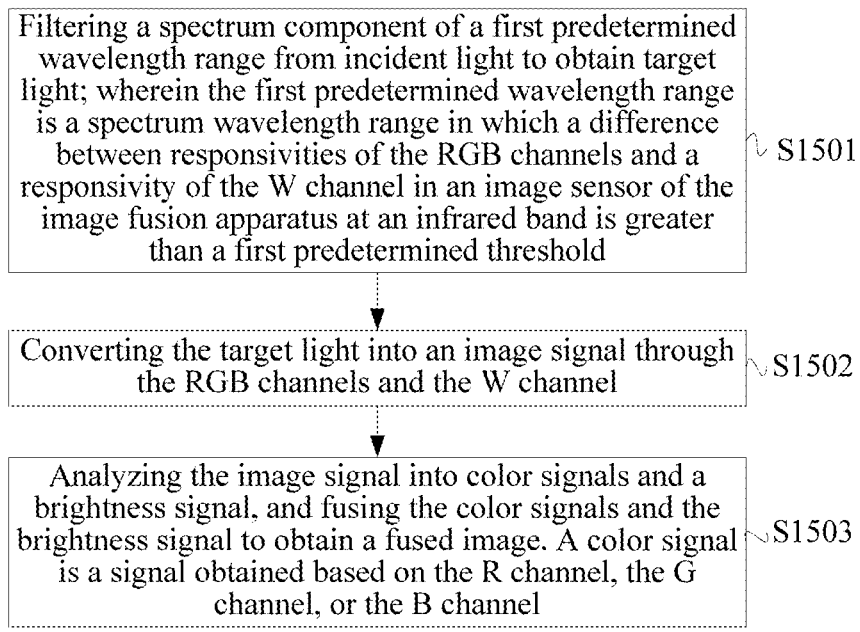
FIG. 15 is a flowchart of an image fusion method applicable to an image fusion apparatus provided by the second aspect, which is provided by an embodiment of the present application.

In the fourth aspect, based on the image fusion apparatus provided in the second aspect, an embodiment of the present application further provides an image fusion method. The method is applicable to the image fusion apparatus provided by the embodiments of the present application in the second aspect. The image fusion apparatus has four types of photosensitive channels, which include red, green and blue RGB channels and a full-band W channel. As shown in FIG. 15, the method includes the steps S1501-1503.

Step S1501, filtering a spectrum component of a first predetermined wavelength range from incident light to obtain target light; wherein the first predetermined wavelength range is a spectrum wavelength range in which a difference between responsivities of the RGB channels and a responsivity of the W channel in an image sensor of the image fusion apparatus at an infrared band is greater than a first predetermined threshold.

Step S1502, converting the target light into an image signal through the RGB channels and the W channel.

The specific implementation of converting the target light into the image signal through the RGB channels and the W channel can be implemented with any approach in the related art, which is not limited herein.

Step S1503, analyzing the image signal into color signals and a brightness signal, and fusing the color signals and the brightness signal to obtain a fused image. A color signal is a signal obtained based on the R channel, the G channel, or the B channel.

It should be emphasized that the spectrum component of the first predetermined wavelength range is filtered out from the incident light, such that the portion in which there is a large difference between the quantum efficiencies of the channels at the near-infrared band is filtered out. This can simplify the operations performed by the image processor to remove the infrared component from the color signals, and thus improve the efficiency of the image fusion. The value of the first predetermined threshold may be set depending on actual conditions, and is not limited herein.

Optionally, in order to allow the infrared band and the visible band to pass, the first predetermined wavelength range may be [T1, T2]. The value of T1 is in the range of [600 nm, 800 nm], and the value of T2 is in the range of [750 nm, 1100 nm].

For the specific structure of the image fusion apparatus, one may refer to the description for the embodiments illustrated in the second aspect, and details will be not described here.

It should be noted that a color signal can be generated by subtracting the value of an IR parameter for pixel position from the value of the R channel, the G channel, or the B channel. The value of the IR parameter is the product of an IR value for the pixel position and a second preset correction value. The IR value is a value calculated using a predetermined formula. It can be appreciated that subtracting the value of the IR parameter for pixel position respectively from the values of the traversed R channel, G channel, and B channel, namely removing the infrared component from the color signals, can avoid the crosstalk between the infrared component and the RGB signal components of the color signals, thereby improving the quality of the image obtained under low illumination. In addition, it should be emphasized that the first preset correction value and the second preset correction value can be set depending on actual conditions. For example, the first preset correction value can be generally set to 2. Of course, the first preset correction value can be set to any integer or fraction ranging from 0 to 1024 depending on actual conditions. Those skilled in the art can appreciate that the value of the first preset correction value is not limited thereto. Similarly, the second preset correction value can be generally set to 1. Of course, the second preset correction value can also be set to any integer or fraction ranging from 0 to 1024 depending on actual conditions. Those skilled in the art can appreciate that the value of the second preset correction value is not limited thereto.

Optionally, in a specific implementation, the step of analyzing the image signal into the color signals and the brightness signal that is photosensitive to the infrared band includes:

step d1, performing an interpolation operation on the W channel of the image signal to generate a brightness signal that has a resolution same as an input resolution, wherein the input resolution is a resolution of the image signal;

step d2, performing interpolation operations on the R channel, the G channel and the B channel of the image signal respectively, to generate an image signal of each of the channels which has a resolution same as the input resolution;

step d3, traversing the image signal of each of the channels, and calculating an IR value for each pixel position by a predetermined formula, which is (R+G+B−W)/n, wherein R is the value of the R channel of the pixel, G is the value of the G channel of the pixel, B is the value of the B channel of the pixel, W is the value of the W channel of the pixel, and n is a first preset correction value; and step d4, traversing the image signal of each of the channels, and subtracting a value of an IR parameter for a pixel position from a value of the traversed R channel, G channel, or B channel to generate a color signal, where the value of the IR parameter is the product of the IR value for the pixel position and a second preset correction value.

For a detailed description of the steps d1-d4 of the embodiment, reference may be made to the corresponding descriptions for the image fusion apparatus embodiments provided by the second aspect, and details will be not described herein.

It should be noted that there are several specific implementations of performing a fusion process on the color signals and the brightness signal to obtain the fused image. Two of the implementations will be described in detail below.

In a specific implementation, the process of fusing the color signals and the brightness signal to obtain the fused image may include:

step e1, calculating an auxiliary value Y for each pixel according to the color signals as Y=(R*w1+G*w2+B*w3)/(w1+w2+w3), where R is the value of the R channel of pixel, G is the value of the G channel of pixel, B is the value of the B channel of pixel, and w1, w2 and w3 are weights;

step e2, calculating a ratio of the value of each channel of the color signals to the auxiliary value Y to obtain reference channel values K1, K2, and K3 for the pixel, which are K1=R/Y, K2=G/Y, K3=B/Y;

step e3, performing chroma noise reduction on the reference channel values K1, K2, and K3; and step e4, fusing a brightness value Y' of the pixel and the reference channel values K1-K3 subjected to the chroma noise reduction, to generate fused values of the three channels (RGB channels) R', G' and B' and to obtain the post-fusion image; which are R'=K1*Y'; G'=K2*Y'; B'=K3*Y'.

For a detailed description of the steps e1-e4 of the present embodiment, reference may be made to the corresponding descriptions for the image fusion apparatus embodiments provided in the second aspect, and details will be not described here.

Specifically, in another specific implementation, the step of fusing the color signals and the brightness signal to obtain the fused image may include:

step f1, converting the color signals into YUV signals, wherein the YUV signals are luminance and chrominance signals;

step f2, extracting chrominance UV components in the YUV signals;

step f3, combining the UV components with the brightness signal to form new YUV signals; and step f4, determining the new YUV signals as the fused image, or converting the new YUV signals into RGB signals and determining the resulting RGB signals as the fused image.

For a detailed description of the steps f1-f4 of the present embodiment, reference may be made to the corresponding descriptions for the image fusion apparatus embodiments provided in the second aspect, and details will be not described here.

Further, in converting the target light into the image signal, multiple-exposures acquisition may be performed in one frame time. One or multiple exposures can be manually set, which is of course not limited thereto.

Moreover, for the image fusion apparatus performing multiple-exposures acquisition in one frame time, the step of analyzing the image signal into the color signals and the brightness signal that is photosensitive to the infrared band may include:

analyzing an image signal generated by using an exposure of a first type to obtain the color signals; and analyzing an image signal generated by using an exposure of a second type to obtain a brightness signal.

The exposure of the first type and the exposure of the second type may or may not have same exposure duration. When the exposure duration of the exposure of the first type is different from that of the exposure of the second type, the exposure duration of the exposure of the first type may be less than the exposure duration of the exposure of the second type. Of course, the exposure duration of the exposure of the first type may also be greater than the exposure duration of the exposure of the second type.

Specifically, the step of analyzing the image signal generated by using an exposure of the first type to obtain the color signals may include:

performing an interpolation operation on the R channel, the G channel and the B channel of the image signal generated by the exposure of the first type respectively, to generate an image signal of each of the channels which has a resolution same as the input resolution;

traversing the image signal of each of the channels, and calculating an IR value for each pixel position by a predetermined formula (R+G+B−W)/n, where R is the value of the R channel of the pixel, G is the value of the G channel of the pixel, B is the value of the B channel of the pixel, W is the value of the W channel of the pixel, and n is a first preset correction value; and traversing the image signal of each of the channels, and subtracting the value of an IR parameter for a pixel position from the value of the traversed R channel, G channel, or B channel to generate color signals, where the value of the IR parameter is the product of the IR value for the pixel position and a second preset correction value.

Correspondingly, the step of analyzing the image signal generated by using an exposure of the second type to obtain a brightness signal may specifically include:

performing an interpolation operation on the W channel of the image signal generated by the exposure of the second type to generate a brightness signal that has a resolution same as an input resolution. The input resolution is the resolution of the image signal.

The interpolation of any of the channels involved in the above processes may be implemented by a bilinear interpolation or a bicubic interpolation, which is, of course, not limited thereto.

The image fusion method provided by the embodiments of the present application can reduce the amount of calculation for removing the infrared component from the color signals, which improves the fusion efficiency and achieves the objective of capturing a dual-band image through an image fusion apparatus with a simple structure at the same time.

Corresponding to the image fusion method provided by the above third aspect, an embodiment of the present application further provides a storage medium for storing executable program codes. The executable program codes are executed to perform steps of any one of the image fusion methods provided by the embodiments in the above third aspect.

After the executable program codes stored in the storage medium provided by the embodiment of the present application is executed by an image fusion apparatus provided by the first aspect, the amount of calculation for removing the infrared component from the color signals can be reduced, which improves the fusion efficiency and achieves the objective of capturing a dual-band image through an image fusion apparatus with a simple structure at the same time.

Corresponding to the image fusion method provided by the above fourth aspect, an embodiment of the present application provides a storage medium for storing executable codes. The executable codes are executed to perform steps of any one of the image fusion methods provided by the embodiments in the above fourth aspect.

After the executable program codes stored in the storage medium provided by the embodiment of the present application is executed by an image fusion apparatus provided by the second aspect, the amount of calculation for removing the infrared component from the color signals can be reduced, which improves the fusion efficiency and achieves the objective of capturing a dual-band image through an image fusion apparatus with a simple structure at the same time.

Corresponding to the image fusion method provided by the above third aspect, an embodiment of the present application provides an application program for performing, when executed, steps of any of the image fusion methods provided by above method embodiments.

The application program provided by the embodiment of the present application, when executed on the image fusion apparatus provided in the first aspect, can reduce the amount of calculation for removing the infrared component from the color signals, which improves the fusion efficiency and achieves the objective of capturing a dual-band image through an image fusion apparatus with a simple structure at the same time.

Corresponding to the image fusion method provided in the above fourth aspect, an embodiment of the present application provides an application program for performing, when executed, steps of any of the image fusion methods provided by the above method embodiments.

The application program provided by the embodiment of the present application, when executed on the image fusion apparatus provided in the second aspect, can reduce the amount of calculation for removing the infrared component from the color signals, which improves the fusion efficiency and achieves the objective of capturing a dual-band image through an image fusion apparatus with a simple structure at the same time.

In addition, the wording "first type", "second type", "third type", "fourth type", "first" and "second" involved in the embodiments herein are only used to identify different objects of the same category in terms of naming, so that the objects can be easily and clearly referred to. Such wording does not have any limiting meaning.

It should be noted that, the relationship terms such as "first," "second" and the like herein are only used to distinguish one entity or operation from another entity or operation, and do not necessarily require or imply that there is any actual relationship or order between those entities or operations. Moreover, the terms "include", "comprise" or any variants thereof are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a/an . . . " do not exclude that there are other identical elements in the processes, methods, objects, or devices that comprise that element.

The various embodiments herein are described in a related manner, and the same or similar parts of the embodiments may be referred to each other, and the description for each embodiment focuses on a part different from that of the other embodiments. In particular, the apparatus/device embodiments are basically similar to the method embodiments, the description for the former is relatively simple, and the relevant parts can be referred to the description of the method embodiment.

The above description is only for preferred embodiments, and is not intended to limit the protection scope of the present application. Any modifications, equivalent substitutions, improvements, and the like made within the spirit and principle of the present application fall within the protection scope of the present application.

The invention claimed is:
1. An image fusion apparatus, comprising:
a light acquisition device, an image processor, and an image sensor having four types of photosensitive channels, the four types of photosensitive channels comprising red, green and blue RGB channels and an infrared IR channel, or the four types of photosensitive channels comprising the RGB channels and a full-band W channel; wherein when the four types of photosensitive channels comprise the RGB channels and the IR channel,
the light acquisition device is configured to filter a spectrum component of a first predetermined wavelength range from incident light to obtain target light; wherein the first predetermined wavelength range is a spectrum wavelength range in which a difference between responsivities of the RGB channels and a responsivity of the IR channel in the image sensor at an infrared band is greater than a first predetermined threshold;
the image sensor is configured to convert the target light into an image signal through the RGB channels and the IR channel; and
the image processor is configured to analyze the image signal into color signals and a brightness signal that is photosensitive to the infrared band, and fuse the color signals and the brightness signal to obtain a fused image, wherein the color signal is a signal obtained based on the R channel, the G channel, or the B channel, or when the four types of photosensitive channels comprise the RGB channels and the W channel,
the light acquisition device is configured to filter a spectrum component of a first predetermined wavelength range from incident light to obtain target light; wherein the first predetermined wavelength range is a spectrum wavelength range in which a difference between responsivities of the RGB channels and a responsivity of the W channel in the image sensor at an infrared band is greater than a first predetermined threshold;
the image sensor is configured to convert the target light into an image signal through the RGB channels and the W channel; and
the image processor is configured to analyze the image signal into color signals and a brightness signal, and fuse the color signals and the brightness signal to obtain a fused image, wherein the color signal is a signal obtained based on the R channel, the G channel, or the B channel.

2. The image fusion apparatus according to claim 1, wherein the color signal is generated by subtracting a value of an IR parameter for a pixel position from a value of the R channel, the G channel, or the B channel, wherein
when the four types of photosensitive channels comprise the RGB channels and the IR channel, the value of the IR parameter is a product of a value of the IR channel at the pixel position and a preset correction value; and
when the four types of photosensitive channels comprise the RGB channels and the W channel, the value of the IR parameter is a product of an IR value for the pixel position and a second preset correction value, wherein the IR value is a value calculated by a predetermined formula.

3. The image fusion apparatus according to claim 2, wherein the process that the image processor analyzes the image signal into the color signals and the brightness signal comprises:
when the four types of photosensitive channels comprise the RGB channels and the IR channel,
performing an interpolation operation on the IR channel of the image signal to generate a brightness signal that has a resolution same as an input resolution and is photosensitive to the infrared band, wherein the input resolution is a resolution of the image signal;
traversing the image signal and subtracting a value of an IR parameter for a pixel position from a value of the traversed R channel, G channel, or B channel, wherein the value of the IR parameter is a product of a value of the IR channel at the pixel position and a preset correction value; and
performing interpolation operations on the R channel, the G channel and the B channel of the image signal respectively, to generate the color signals having a resolution same as the input resolution, and when the four types of photosensitive channels comprise the RGB channels and the W channel,
performing an interpolation operation on the W channel of the image signal to generate a brightness signal that has a resolution same as an input resolution, wherein the input resolution is a resolution of the image signal;
performing interpolation operations on the R channel, the G channel and the B channel of the image signal respectively, to generate an image signal of each of the RGB channels which has a resolution same as the input resolution;
traversing the image signal of each of the channels, and calculating an IR value for each pixel position by a predetermined formula, which is $(R+G+B-W)/n$, wherein R is a value of the R channel of the pixel, G is a value of the G channel of the pixel, B is a value of the B channel of the pixel, W is a value of the W channel of the pixel, and n is a first preset correction value; and
traversing the image signal of each of the channels, and subtracting a value of an IR parameter for a pixel position from a value of the traversed R channel, G channel, or B channel to generate a color signal, wherein the value of the IR parameter is a product of an IR value for the pixel position and a second preset correction value.

4. The image fusion apparatus according to claim 1, wherein the process that the image processor fuses the color signals and the brightness signal to obtain the fused image comprises:
calculating an auxiliary value Y for each pixel according to the color signals, as $Y=(R*w1+G*w2+B*w3)/(w1+w2+w3)$, wherein R is a value of the R channel of the pixel, G is a value of the G channel of the pixel, B is a value of the B channel of the pixel, and w1, w2 and w3 are weights;
calculating a ratio of the value of each channel of the color signals to the auxiliary value Y to obtain reference channel values K1, K2, and K3 for the pixel, which are $K1=R/Y$, $K2=G/Y$, $K3=B/Y$;
performing chroma noise reduction on the reference channel values K1, K2, and K3; and
fusing a brightness value Y' of the pixel and the reference channel values K1–K3 subjected to the chroma noise reduction, to generate values of fused RGB channels R', G' and B' and to obtain the fused image; wherein $R'=K1*Y'$; $G'=K2*Y'$; $B'=K3*Y'$,
or
wherein the process that the image processor fuses the color signals and the brightness signal to obtain the fused image comprises:
converting the color signals into YUV signals, wherein the YUV signals are luminance and chrominance signals;
extracting chrominance UV components in the YUV signals;

combining the UV components with the brightness signal to form new YUV signals; and determining the new YUV signals as the fused image, or converting the new YUV signals into RGB signals and determining the resulting RGB signals as the fused image.

5. The image fusion apparatus according to claim 1, wherein the light acquisition device comprises a band-stop filter and an optical lens of a first type; wherein the optical lens of the first type is configured to transmit the incident light to the band-stop filter in a full spectrum transmission manner; and the band-stop filter is configured to filter the spectrum component of the first predetermined wavelength range from the light transmitted from the optical lens of the first type to obtain the target light, or wherein the light acquisition device comprises an optical lens of a second type, which is capable of filtering the spectrum component of the first predetermined wavelength range.

6. The image fusion apparatus according to claim 1, wherein the first predetermined wavelength range is [T1, T2], wherein the value of T1 is in a range of [600 nm, 800 nm], and the value of T2 is in a range of [750 nm, 1100 nm].

7. The image fusion apparatus according to claim 1, wherein during the conversion from the target light into the image signal by the image sensor, in a second predetermined wavelength range of the infrared band, differences between responsivities of the RGB channels are lower than a second predetermined threshold.

8. The image fusion apparatus according to claim 7, wherein the second predetermined wavelength range is [T3, T4], wherein T4 is greater than T3, T3 is greater than or equal to 750 nm, and T4 is less than or equal to 1100 nm.

9. The image fusion apparatus according to claim 1, wherein the process that the image sensor converts the target light into the image signal comprises that the image sensor performs multiple-exposures acquisition in one frame time.

10. The image fusion apparatus according to claim 9, wherein the process that the image processor analyzes the image signal into the color signals and the brightness signal that is photosensitive to the infrared band comprises:

analyzing an image signal generated by using an exposure of a first type to obtain the color signals; and analyzing an image signal generated by using an exposure of a second type to obtain the brightness signal, wherein when the four types of photosensitive channels comprise the RGB channels and the IR channel, the brightness signal is a brightness signal that is photosensitive to the infrared band.

11. The image fusion apparatus according to claim 10, wherein exposure duration of the exposure of the first type is less than that of the exposure of the second type.

12. The image fusion apparatus according to claim 1, further comprising a signal controller, configured to control the image sensor to generate an image signal that meets a predetermined brightness requirement.

13. The image fusion apparatus according to claim 12, wherein the signal controller is further configured to analyze brightness of image signals generated by the image sensor, and control the image sensor according to an analyzing result to generate the image signal that meets the predetermined brightness requirement.

14. The image fusion apparatus according to claim 12, wherein the signal controller is further configured to control the image sensor to switch between one-exposure acquisition and multiple-exposures acquisition.

15. The image fusion apparatus according to claim 12, further comprising an infrared light filling device; wherein the signal controller is further configured to control the infrared light filling device to fill infrared light for the image sensor.

16. An image fusion method, applicable to an image fusion apparatus having four types of photosensitive channels, the four types of photosensitive channels comprising red, green and blue RGB channels and an infrared IR channel, or the four types of photosensitive channels comprising the RGB channels and a full-band W channel; the method comprising:

when the four types of photosensitive channels comprise the RGB channels and the IR channel, filtering a spectrum component of a first predetermined wavelength range from incident light to obtain target light; wherein the first predetermined wavelength range is a spectrum wavelength range in which a difference between responsivities of the RGB channels and a responsivity of the IR channel in an image sensor of the image fusion apparatus at an infrared band is greater than a first predetermined threshold;

converting the target light into an image signal through the RGB channels and the IR channel; and analyzing the image signal into color signals and a brightness signal that is photosensitive to the infrared band, and fusing the color signals and the brightness signal to obtain a fused image, wherein the color signal is a signal obtained based on the R channel, the G channel, or the B channel, or when the four types of photosensitive channels comprise the RGB channels and the W channel, filtering a spectrum component of a first predetermined wavelength range from incident light to obtain target light; wherein the first predetermined wavelength range is a spectrum wavelength range in which a difference between responsivities of the RGB channels and a responsivity of the W channel in an image sensor of the image fusion apparatus at an infrared band is greater than a first predetermined threshold;

converting the target light into an image signal through the RGB channels and the W channel; and analyzing the image signal into color signals and a brightness signal, and fusing the color signals and the brightness signal to obtain a fused image, wherein the color signal is a signal obtained based on the R channel, the G channel, or the B channel.

17. The method according to claim 16, wherein the color signal is generated by subtracting a value of an IR parameter for a pixel position from a value of the R channel, the G channel, or the B channel, wherein when the four types of photosensitive channels comprise the RGB channels and the IR channel, the value of the IR parameter is a product of a value of the IR channel at the pixel position and a preset correction value; and when the four types of photosensitive channels comprise the RGB channels and the W channel, the value of the IR parameter is a product of an IR value for the pixel position and a second preset correction value, wherein the IR value is a value calculated by a predetermined formula.

18. The method according to claim 17, wherein the step of analyzing the image signal into the color signals and the brightness signal comprises:

when the four types of photosensitive channels comprise the RGB channels and the IR channel,
- performing an interpolation operation on the IR channel of the image signal to generate a brightness signal that has a resolution same as an input resolution and is photosensitive to the infrared band, wherein the input resolution is a resolution of the image signal;
- traversing the image signal and subtracting a value of an IR parameter for a pixel position from a value of the traversed R channel, G channel, or B channel, wherein the value of the IR parameter is a product of a value of the IR channel at the pixel position and a preset correction value; and
- performing interpolation operations on the R channel, the G channel and the B channel of the image signal respectively, to generate the color signals having a resolution same as the input resolution, and when the four types of photosensitive channels comprise the RGB channels and the W channel,
- performing an interpolation operation on the W channel of the image signal to generate a brightness signal that has a resolution same as an input resolution, wherein the input resolution is a resolution of the image signal;
- performing interpolation operations on the R channel, the G channel and the B channel of the image signal respectively, to generate image signals of each of the RGB channels which has a resolution same as the input resolution;
- traversing the image signal of each of the channels, and calculating an IR value for each pixel position by a predetermined formula, which is (R+G+B−W)/n, wherein R is a value of the R channel of the pixel, G is a value of the G channel of the pixel, B is a value of the B channel of the pixel, W is a value of the W channel of the pixel, and n is a first preset correction value; and
- traversing the image signal of each of the channels, and subtracting a value of an IR parameter for a pixel position from a value of the traversed R channel, G channel, or B channel to generate a color signal, wherein the value of the IR parameter is a product of an IR value for the pixel position and a second preset correction value.

19. The method according to claim 16, wherein the step of fusing the color signals and the brightness signal to obtain the fused image comprises:
- calculating an auxiliary value Y for each pixel according to the color signals, as Y=(R*w1+G*w2+B*w3)/(w1+w2+w3), wherein R is a value of the R channel of the pixel, G is a value of the G channel of the pixel, B is a value of the B channel of the pixel, and w1, w2 and w3 are weights;
- calculating a ratio of the value of each channel of the color signals to the auxiliary value Y to obtain reference channel values K1, K2, and K3 for the pixel, which are K1=R/Y, K2=G/Y, K3=B/Y;
- performing chroma noise reduction on the reference channel values K1, K2, and K3; and
- fusing a brightness value Y' of the pixel and the reference channel values K1-K3 subjected to the chroma noise reduction, to generate values of fused RGB channels R', G' and B' and to obtain the fused image; wherein R'=K1*Y'; G'=K2*Y'; B'=K3*Y'.

20. The method according to claim 16, wherein the step of fusing the color signals and the brightness signal to obtain the fused image comprises:
- converting the color signals into YUV signals, wherein the YUV signals are luminance and chrominance signals;
- extracting chrominance UV components in the YUV signals;
- combining the UV components with the brightness signal to form new YUV signals; and
- determining the new YUV signals as the fused image, or converting the new YUV signals into RGB signals and determining the resulting RGB signals as the fused image.

* * * * *